(12) United States Patent
Hanaoka (10) Patent No.: US 11,335,998 B2
(45) Date of Patent: May 17, 2022

(54) ANTENNA MODULE

(71) Applicant: Yazaki Corporation, Tokyo (JP)

(72) Inventor: Hiromichi Hanaoka, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 16/929,729

(22) Filed: Jul. 15, 2020

(65) Prior Publication Data

US 2021/0021022 A1    Jan. 21, 2021

(30) Foreign Application Priority Data

Jul. 19, 2019  (JP) .............................. JP2019-133782

(51) Int. Cl.
*H01Q 1/32* (2006.01)
*H01Q 7/00* (2006.01)

(52) U.S. Cl.
CPC ......... *H01Q 1/3291* (2013.01); *H01Q 1/3275* (2013.01); *H01Q 7/00* (2013.01)

(58) Field of Classification Search
CPC ...... H01Q 1/3291; H01Q 1/3275; H01Q 7/00; H01Q 1/526; H01Q 1/3241; H04B 5/0081
See application file for complete search history.

(56) References Cited

U.S. PATENT DOCUMENTS

| 6,225,954 | B1 * | 5/2001 | Edvardsson ......... H01Q 1/3241 343/713 |
| 2006/0214866 | A1 * | 9/2006 | Araki ...................... H01Q 7/08 343/788 |
| 2015/0145646 | A1 | 5/2015 | Seino |

FOREIGN PATENT DOCUMENTS

| DE | 10 2016 121335 A1 | 5/2018 |
| JP | 2002-046541 A | 2/2002 |
| JP | 2010-222841 A | 10/2010 |
| JP | 2013-070545 A | 4/2013 |
| JP | 2018-021385 A | 2/2018 |
| WO | 99/63617 A1 | 12/1999 |

* cited by examiner

*Primary Examiner* — Hai V Tran
*Assistant Examiner* — Michael M Bouizza
(74) *Attorney, Agent, or Firm* — Banner & Witcoff, Ltd.

(57) ABSTRACT

An antenna module is configured to be attached to a ceiling of a vehicle, the antenna module including an antenna and a magnetic body including a pair of walls spaced apart from each other. The antenna is accommodated between the pair of walls. The magnetic body may be disposed on the ceiling of the vehicle such that the magnetic body shields a magnetic field generated by the antenna and directed toward a window of the vehicle.

10 Claims, 8 Drawing Sheets

ANTENNA MODULE

CROSS-REFERENCE TO RELATED APPLICATION

The present application claims priority to Japanese Patent Application No. 2019-133782 filed on Jul. 19, 2019, the entire content of which is incorporated herein by reference.

TECHNICAL FIELD

The present invention relates to an antenna module to be mounted on a vehicle.

BACKGROUND

A related art antenna is mounted on a vehicle and communicates with a communication terminal such as a smart key (see, for example, JP 2013-70545 A and JP 2002-46541 A). The antenna is disposed on a floor of the vehicle to prevent a magnetic field from leaking out of the vehicle through a window of the vehicle.

However, there are many factors that restrict spaces to mount the antenna on the floor, such as seats and the like on the floor of the vehicle. Therefore, it is also conceivable to dispose the antenna on a ceiling. However, since the ceiling is close to the window, the magnetic field may leak out of the vehicle through the window when the antenna is disposed on the ceiling, resulting in erroneous communication.

SUMMARY

Illustrative aspects of the present invention provide an antenna module configured to prevent leakage of a magnetic field outside a window even if an antenna is disposed on a ceiling.

According to an illustrative aspect of the present invention, an antenna module configured to be attached to a ceiling of a vehicle includes an antenna and a magnetic body including a pair of walls spaced apart from each other. The antenna is accommodated between the pair of walls.

Other aspects and advantages of the invention will be apparent from the following description, the drawings and the claims.

DETAILED DESCRIPTION

Specific embodiments of the present invention will be described below with reference to the drawings.

Figure 6:
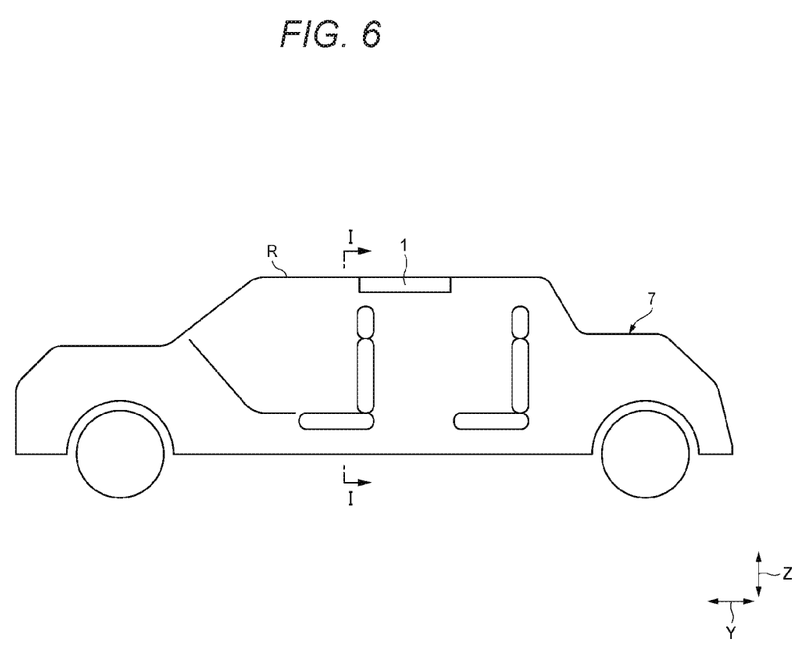
FIG. 6 is a schematic side view of a vehicle to which the antenna module shown in FIGS. 1 to 3 is attached.
Figure 7:
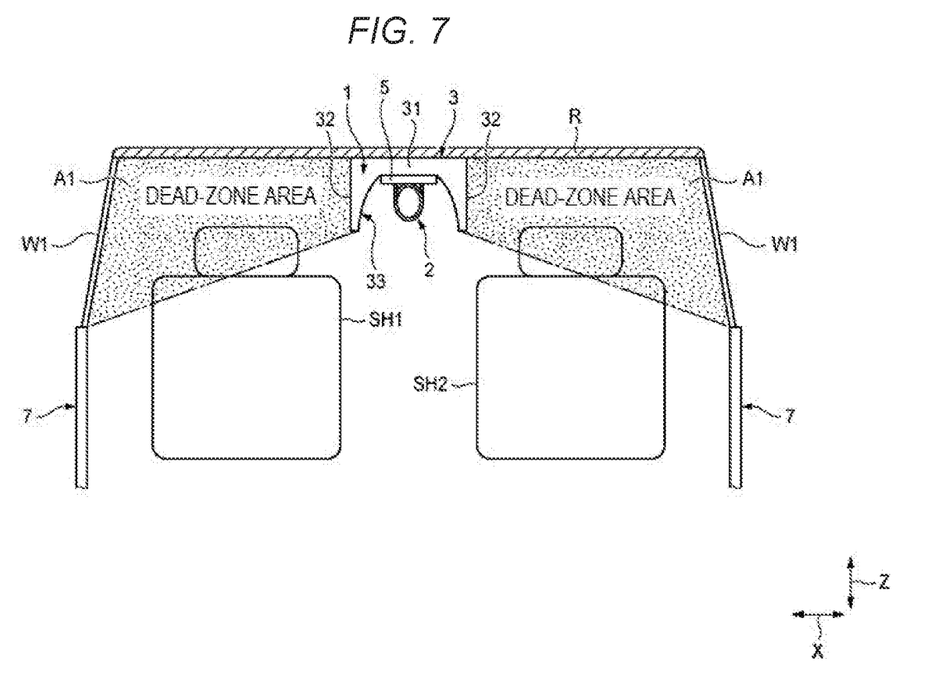
FIG. 7 is a sectional view taken along a line I-I of FIG. 6.
Figure 8:
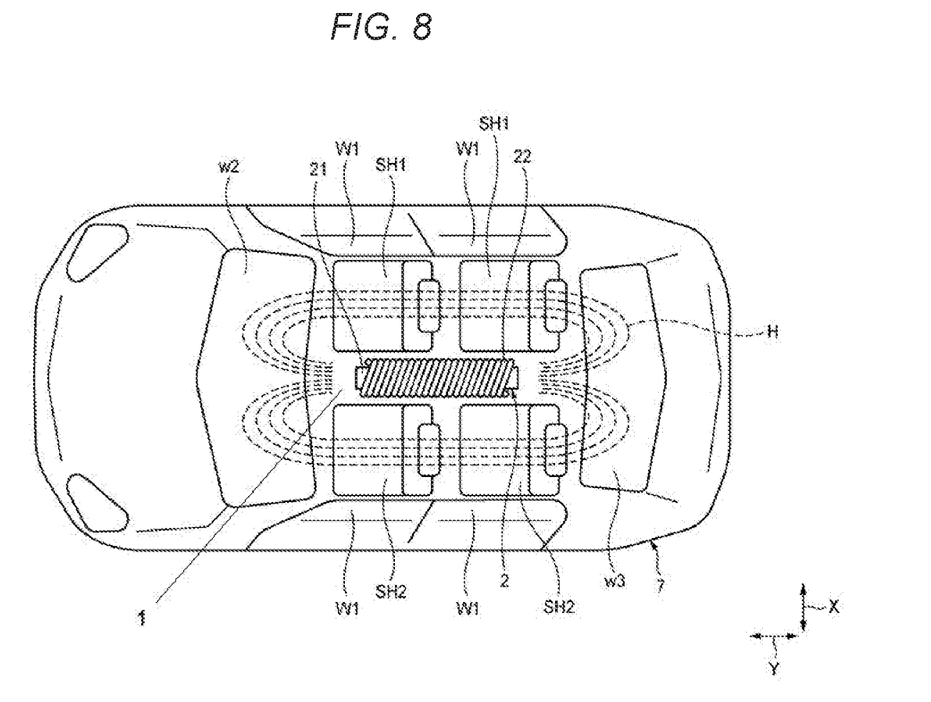
FIG. 8 is a schematic top view of a vehicle to which the antenna module shown in FIGS. 1 to 3 is attached.

As shown in FIGS. 6 to 8, an antenna module 1 of the present embodiment is attached to a ceiling R of a vehicle 7 and is used for, for example, a keyless entry system. The keyless entry system is a system that locks and unlocks a door if locking operation or unlocking operation of the door is detected when a smart key is in the vicinity of the vehicle 7. The keyless entry system has a function of notifying that the smart key is left in the vehicle 7 when the smart key is actually left in the vehicle 7 while the locking operation of the door is performed. The antenna module 1 of the present embodiment is used to detect whether a smart key is in the vehicle 7.

In the keyless entry system, the antenna module 1 transmits an LF signal to a smart key. The antenna module 1 forms a magnetic field only within the vehicle 7 so that the LF signal can be received by a smart key in the vehicle 7 but not by a smart key outside the vehicle 7. The smart key transmits an RF signal when receiving the LF signal, and an RF antenna (not shown) provided in the vehicle 7 receives the RF signal. At this time, the antenna module 1 detects a smart key left in the vehicle 7.

Figure 1:
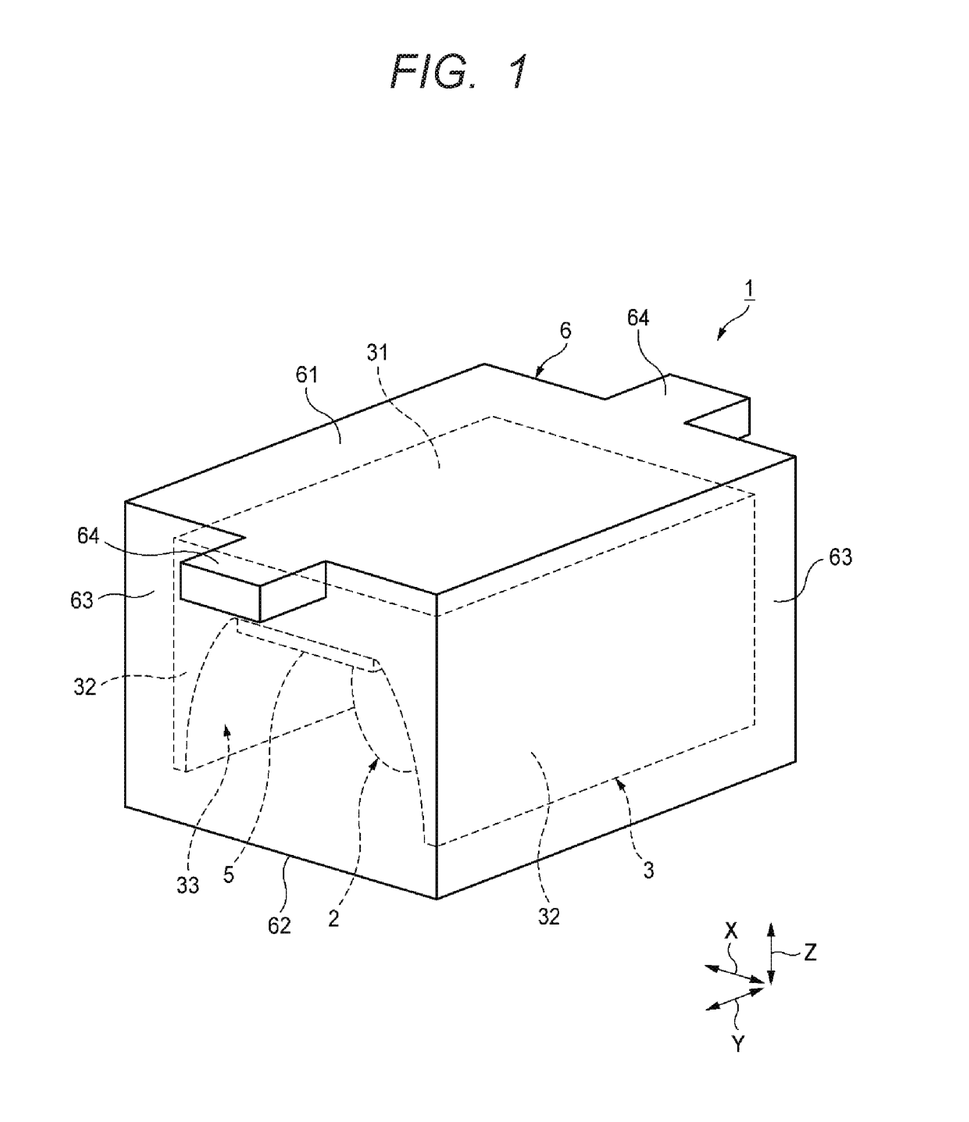
FIG. 1 is a perspective view showing an appearance of an antenna module of the present invention.
Figure 2:
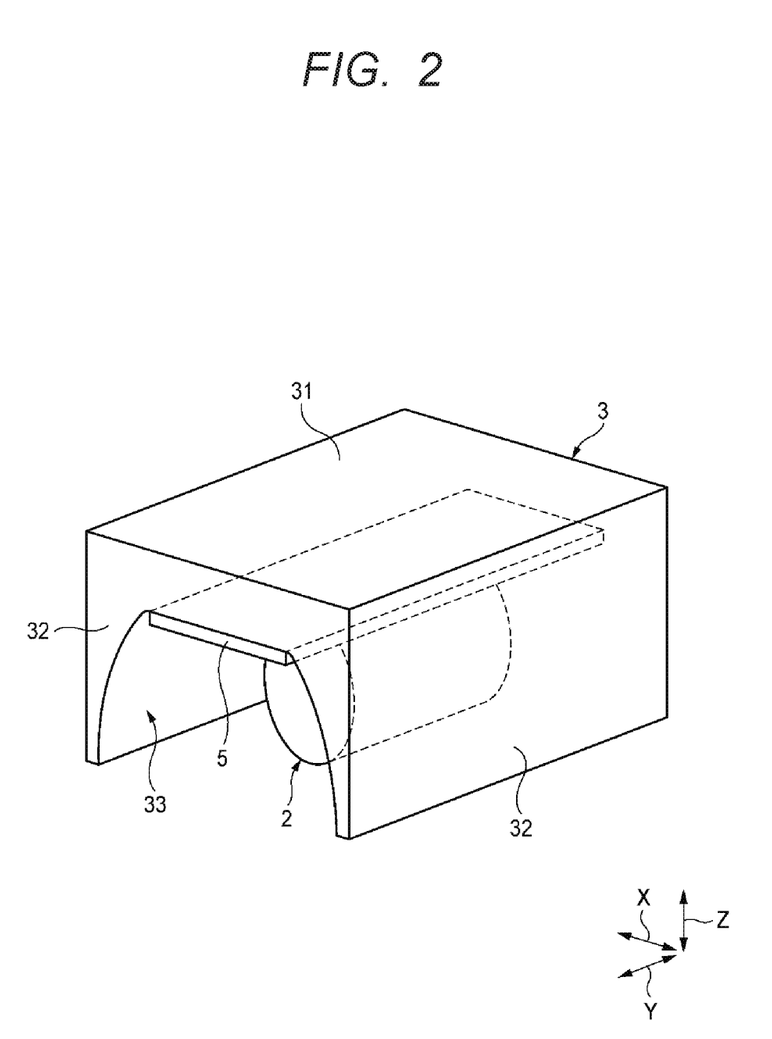
FIG. 2 is a perspective view of the antenna module from which an accommodation case shown in FIG. 1 is removed.
Figure 3:
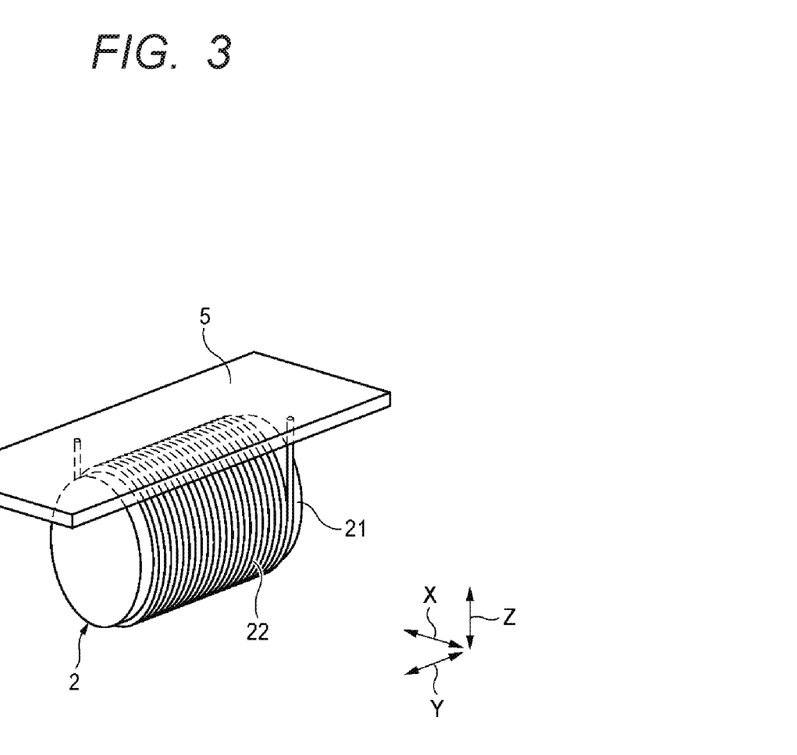
FIG. 3 is a perspective view of the antenna module from which a magnetic body and a substrate shown in FIG. 2 are removed.

The configuration of the antenna module 1 will be described with reference to FIGS. 1 to 3. X in the drawings indicates a width direction of the vehicle 7, Y indicates a front-rear direction of the vehicle 7, and Z indicates an upper-lower direction of the vehicle 7. As shown in FIGS. 1 to 3, the antenna module 1 includes a LF antenna 2 (antenna), a magnetic body 3 for shielding a magnetic field generated by the LF antenna 2 and directed toward a side window (window) W1 (shown in FIG. 8) of the vehicle 7, a substrate 5 on which a driver 4 configured to drive the LF antenna 2, or the like is mounted, and an accommodation case 6 for accommodating these LF antenna 2, the magnetic body 3, and the substrate 5.

The LF antenna 2 of the present embodiment transmits an LF signal in an LF band. As shown in FIG. 3, the LF antenna 2 includes a magnetic core 21 having a columnar shape and a coil 22 spirally wound around the magnetic core 21.

As shown in FIG. 2, the magnetic body 3 includes an upper wall 31 extending longer in the front-rear direction Y than the width direction X and a pair of vertical walls (walls) 32, 32 extending downward from both ends of the upper wall 31 in the width direction X, and a groove 33 extending continuously from one end to the other end in the front-rear direction Y of the magnetic body 3. The pair of vertical walls 32, 32 and the groove 33 are long in the front-rear direction (longitudinal direction) Y. The groove 33 opens downward and at both sides in the front-rear direction Y of the magnetic body 3. The groove 33 is closed by the upper wall 31, i.e. the groove has the upper wall 31 as its bottom. The groove 33 has a cross section of semicircular shape in which a vertex of the semicircular shape is flattened continuously from the one end to the other end in the front-rear direction Y.

That is, an upper surface (bottom) of the groove 33 is flat, and an inner surface thereof is formed in a curved surface such that the width of the groove 33 decreases toward the upper surface, i.e., the width of the groove 33 increases downward. The LF antenna 2 is accommodated in the groove 33 provided between the pair of vertical walls 32, 32. The LF antenna 2 is accommodated between the pair of vertical walls 32, 32 such that an axial direction of the coil 22 (i.e., front-rear direction Y) is perpendicular to a direction in which the pair of vertical walls 32, 32 face each other (i.e., a facing direction of width direction X). In the present embodiment, as shown in FIG. 7, the LF antenna 2 does not extend beyond a lower opening of the groove 33 to the outside of the groove 33, and the entire LF antenna 2 is accommodated in the groove 33.

The coil 22 shown in FIG. 3 is spirally wound around the magnetic core 21.

Figure 4:
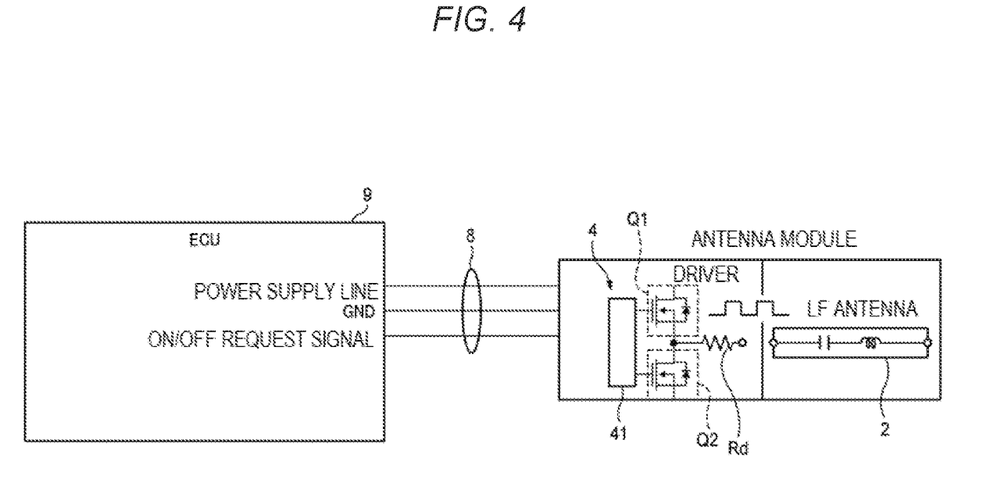
FIG. 4 is a diagram showing an electrical configuration of the antenna module shown in FIGS. 1 to 3.

A resonance capacitor (not shown) forming a resonance circuit together with the coil 22, and the driver 4 for driving the LF antenna 2 are mounted on the substrate 5. As shown in FIG. 4, the driver 4 includes two FETs Q1, Q2 connected in series, and a gate drive circuit 41 for driving the two FETs Q1, Q2 on and off. The driver 4 is connected to a keyless entry device 9, which includes an ECU disposed in an instrument panel of the vehicle 7, via a wire harness 8.

Figure 5:
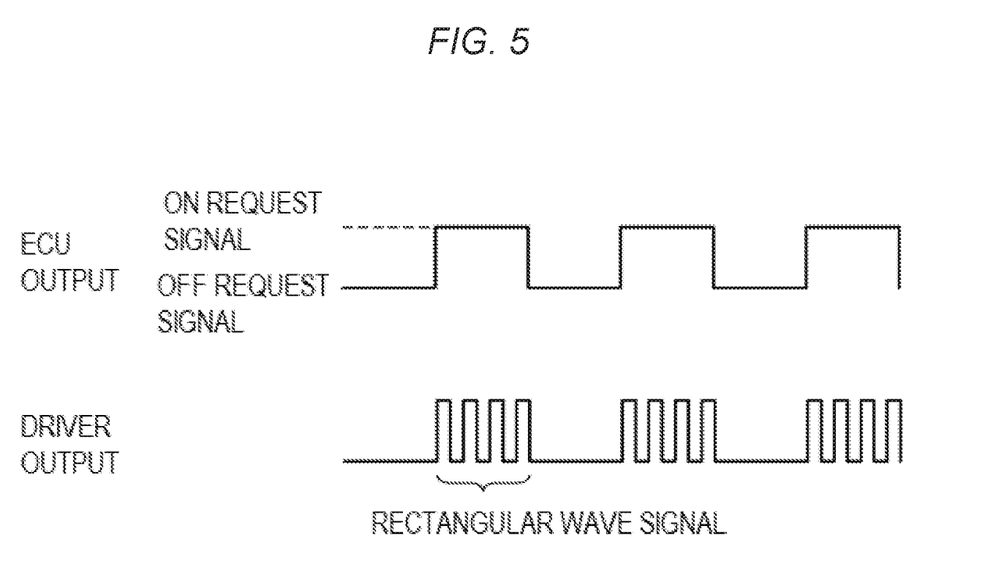
FIG. 5 is a time chart showing outputs of an ECU and a driver shown in FIG. 4.

A power supply line, a ground line, and an ON/OFF request signal line are included in the wire harness 8, and power supply and an ON-OFF request signal are supplied to the driver 4 from the keyless entry device 9 through the wire harness 8. As shown in FIG. 5, the keyless entry device 9 outputs a Hi-level ON request signal requesting ON and a Lo-level OFF request signal requesting OFF. When the ON request signal is input, the gate drive circuit 41 controls ON/OFF of the two FETs Q1, Q2 in the opposite phase (exclusively) to generate a rectangular wave signal (shown in FIG. 5) from the power supply. The rectangular wave signal is applied to a primary coil via dump resistance Rd. As a result, a sinusoidal resonant current is generated in a secondary coil, and an alternating magnetic field is generated in a predetermined space.

As shown in FIG. 2, the substrate 5 is formed in a rectangular shape extending longer in the front-rear direction Y than in the width direction X and is fixed to the flat upper surface (bottom) of the groove 33 of the magnetic body 3 by a locking claw or a screw. As a result, the substrate 5 is disposed between the pair of vertical walls 32, 32 and is disposed being perpendicular to the upper-lower direction Z. The LF antenna 2 is disposed on a lower side of the substrate 5. Both ends of the coil 22 of the LF antenna 2 are connected to the substrate 5 by soldering, connector connection, or the like. As a result, the LF antenna 2 is electrically connected to the substrate 5 and is fixed onto the substrate 5.

The accommodation case 6 is formed of resins or the like. As shown in FIG. 1, the accommodation case 6 includes an upper wall 61, a lower wall 62, and side walls 63 provided between the upper wall 61 and the lower wall 62. The accommodation case 6 is formed in a hollow box shape in which the magnetic body 3 can be accommodated. The upper wall 61 covers the upper wall 31 of the magnetic body 3. The lower wall 62 sandwiches the magnetic body 3 with the upper wall 61, i.e., the magnetic body 3 is disposed between the lower wall 62 and the upper wall 61. The side walls 63 cover both sides of the magnetic body 3 in the width direction X and the front-rear direction Y. The upper wall 61 is provided with attaching stays 64 protruding on both sides in the front-rear direction Y. The attaching stays 64 are to be attached to the ceiling R of the vehicle 7 by screwing or the like.

Next, the arrangement of the antenna module 1 will be described. As shown in FIGS. 6 and 7, the antenna module 1 described above is to be attached to the ceiling R of the vehicle. In the present embodiment, the antenna module 1 is attached to a center of the ceiling R in the width direction X (between a driver seat SH1 and a passenger seat SH2). Specifically, the upper wall 61 and the attaching stays 64 of the accommodation case 6 contact the ceiling R, and the attaching stays 64 are attached thereto by being screwed. At this time, the antenna module 1 is disposed such that the longitudinal direction of the groove 33 (axial direction of the coil 22) is along the front-rear direction Y of the vehicle 7.

As shown in FIG. 8, a magnetic field H, exiting from one end in the axial direction (front-rear direction Y) of the coil 22 toward the other end, is generated in the coil 22. The axial length of the coil 22 is set such that the strength of the magnetic field H cannot be received by the smart key outside the vehicle 7 and thus the magnetic field H does not leak outside a front window W2 and a rear window W3.

When the longitudinal direction of the groove 33 is arranged along the front-rear direction Y of the vehicle 7 as described above, the vertical walls 32 of the magnetic body 3 are disposed side by side in the width direction X of the vehicle 7 as shown in FIG. 7. The magnetic body 3 absorbs a magnetic field from the LF antenna 2. Therefore, magnetic fields directed toward side windows W1 among magnetic fields generated by the LF antenna 2 are absorbed by the magnetic body 3, and thus do not reach side windows W1 in the width direction X of the vehicle 7.

That is, the magnetic body 3 shields magnetic fields generated by the LF antenna 2 and directed toward the side windows W1, and thus, dead-zone areas A1, where magnetic fields do not reach, are provided outside of the vertical walls 32 at both two sides of the vertical walls 32 in the width direction. As a result, the magnetic field can be prevented from leaking outside the side windows W1 even if the LF antenna 2 is disposed on the ceiling R, and erroneous detection that the smart key is in the vehicle 7 due to communication with the smart key outside the vehicle 7 can be prevented.

The mounting space is less likely to be restricted by disposing the antenna module 1 on the ceiling R, as compared with the case where the antenna module 1 is disposed on the floor. Therefore, a plurality of small LF antennas are provided on the floor in the related art, due to restriction of the space, to form a magnetic field only in the vehicle 7. However, according to the present embodiment, one large LF antenna 2 can be provided on the ceiling to form a magnetic field only in the vehicle 7 as shown in FIG. 1.

According to the embodiment described above, the LF antenna 2 is accommodated in the groove 33 such that the axial direction of the coil 22 intersects the facing direction of the pair of vertical walls 32, 32. As a result, when the facing direction of the pair of vertical walls 32, 32 is disposed along the width direction X of the vehicle 7, the magnetic field directed along a direction intersecting the axial direction of the coil 22 toward the side windows W1 can be shielded by the pair of vertical walls 32, 32.

According to the embodiment described above, the driver 4 is also provided on the ceiling R integrally with the LF antenna 2. Therefore, it is not necessary to connect the driver 4 to the LF antenna 2 via the long wire harness 8, and the resonance point shift due to parasitic inductance of the wire harness 8 can be prevented. Therefore, improvement in sensitivity can be achieved by increasing the Q factor of the LF antenna 2, or antenna currents can be reduced by increasing dumping resistance Rd without changing the sensitivity. In addition, since the rectangular wave signal generated by the driver 4 is applied to the LF antenna 2 without passing through the wire harness 8, the radiation noise can be reduced.

According to the embodiment described above, both ends of the coil 22 are connected to the substrate 5, and the substrate 5 is fixed to the inner surface of the groove 33. As a result, the LF antenna 2 is connected to the substrate 5 fixed to the magnetic body 3, in which the LF antenna 2 can be supported.

According to the embodiment described above, the accommodation case 6, which accommodates the LF antenna 2 and the magnetic body 3, is attached to the ceiling R. As a result, the antenna module 1 can be attached to the ceiling R by using the accommodation case 6.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to the embodiment described above, the LF antenna 2 is used for the keyless entry system, but the present invention is not limited thereto. The LF antenna 2 may be used for other communication systems performed only in the vehicle 7.

According to the embodiment described above, the groove 33 provided in the magnetic body 3 is opened in the front-rear direction Y, but a pair of walls closing the opening in the front-rear direction Y may be provided so that the magnetic field generated by the LF antenna 2 and directed toward the front window W2 and the rear window W3 can be shielded by the pair of walls.

The shape of the magnetic body 3 is not limited to the above embodiment, and any shape that can shield the magnetic field from the LF antenna 2 toward the side windows W1 of the vehicle 7 may be used.

Further, according to the embodiment described above, the driver 4 is provided on the side of antenna module 1, but the present invention is not limited thereto. Similarly to the keyless entry device 9, the driver 4 may be disposed in an instrument panel of the vehicle 7.

According to an aspect of the embodiments described above, an antenna module (1) is configured to be attached to a ceiling (R) of a vehicle (7). The antenna module (1) includes an antenna (2) and a magnetic body (3) including a pair of walls (32, 32) spaced apart from each other. The antenna (2) is accommodated between the pair of walls (32, 32).

The magnetic body (3) may be disposed on the ceiling (R) of the vehicle (7) such that the magnetic body (3) shields a magnetic field generated by the antenna (2) and directed toward a window of the vehicle (7).

According to the antenna module having the above configuration, the pair of walls shield the magnetic field generated by the antenna and directed toward the window of the vehicle, so that the magnetic field can be prevented from leaking outside the window even if the antenna is disposed on the ceiling.

The antenna (2) may include a coil (22) spirally wound, the antenna (2) being accommodated between the pair of walls (32, 32) such that an axial direction (Y) of the coil (22) intersects a facing direction (X) in which the pair of walls (32, 32) face each other.

According to the antenna module having the above configuration, the antenna is accommodated such that the axial direction of the coil intersects the facing direction of the pair of walls. As a result, the magnetic field directed along the direction intersecting the axial direction of the coil toward the window can be shielded by the pair of walls.

The antenna module (1) may further include a driver (4) configured to drive the antenna (2).

According to the antenna module having the above configuration, the driver is also provided on the ceiling integrally with the antenna. Therefore, it is not necessary to connect the driver to the antenna via a long wire harness, and the resonance point shift due to parasitic inductance of the wire harness can be prevented.

The antenna module (1) may further include a driver (4) configured to drive the antenna (2) and a substrate (5) on which the driver (4) is mounted. The substrate (5) may be disposed between the pair of walls (32, 32) and may be fixed to the magnetic body (3), and the antenna (2) may be electrically connected to and fixed to the substrate (5).

According to the antenna module having the above configuration, the antenna is connected to the substrate fixed to the magnetic body, so that the antenna can be supported.

The antenna module (1) may further include an accommodation case (6) configured to accommodate the antenna (2) and the magnetic body (3). The accommodation case (6) may be attached to the ceiling (R).

According to the antenna module having the above configuration, the antenna module can be attached to the ceiling using the accommodation case.

The magnetic body (3) may include another pair of walls spaced apart from each other. The antenna (2) may be accommodated between the other pair of walls such that the axial direction (Y) of the coil (22) is parallel to a facing direction in which the other pair of walls face each other.

According to the antenna module having the above configuration, the antenna is accommodated such that the axial direction of the coil is parallel to the facing direction of the other pair of walls. As a result, the magnetic field directed along the axial direction of the coil toward a window can be shielded by the other pair of walls.

What is claimed is:

1. An antenna module configured to be attached to a ceiling of a vehicle, the antenna module comprising:
   an antenna; and
   a magnetic body including an upper wall, a pair of side walls spaced apart from and facing each other, and a groove formed by the upper wall as its bottom surface and the pair of side walls, the groove opening toward a lower side and both sides of the magnetic body in a front-rear direction, and both sides being perpendicular to a facing direction in which the pair of side walls face each other,
   wherein the antenna is accommodated in the groove between the pair of side walls,
   wherein the antenna includes a coil spirally wound, the antenna being accommodated between the pair of side walls such that an axial direction of the coil intersects the facing direction in which the pair of side walls face each other,
   wherein the pair of side walls is provided as inner side surfaces of the groove, and
   wherein a width of the groove between the inner side surfaces increases as the inner side surfaces extend away from the bottom surface.

2. The antenna module according to claim 1, wherein the magnetic body is disposed on the ceiling of the vehicle such that the magnetic body shields a magnetic field generated by the antenna and directed toward a window of the vehicle.

3. The antenna module according to claim 1, further comprising:
   a driver configured to drive the antenna.

4. The antenna module according to claim 1, further comprising:
   an accommodation case configured to accommodate the antenna and the magnetic body,
   wherein the accommodation case is to be attached to the ceiling.

5. The antenna module according to claim 1,
wherein the magnetic body includes another pair of side walls spaced apart from each other, and
wherein the antenna is accommodated between the other pair of side walls such that the axial direction of the coil is parallel to a facing direction in which the other pair of side walls face each other.

6. An antenna module configured to be attached to a ceiling of a vehicle, the antenna module comprising:
an antenna;
a magnetic body including an upper wall, a pair of side walls spaced apart from and facing each other, and a groove formed by the upper wall as its bottom surface and the pair of side walls, the groove opening toward a lower side and both sides of the magnetic body in a front-rear direction, and both sides being perpendicular to a facing direction in which the pair of side walls face each other,
a driver configured to drive the antenna; and
a substrate on which the driver is mounted,
wherein the antenna is accommodated in the groove between the pair of side walls,
wherein the antenna includes a coil spirally wound, the antenna being accommodated between the pair of side walls such that an axial direction of the coil intersects the facing direction in which the pair of side walls face each other,
wherein the bottom surface of the groove is flat,
wherein the substrate is disposed on the bottom surface of the groove between the pair of side walls and is fixed to the magnetic body, and
wherein the antenna is electrically connected to and fixed to the substrate.

7. The antenna module according to claim 6,
wherein the pair of side walls is provided as inner side surfaces of the groove, and
wherein a width of the groove between the inner side surfaces increases as the inner side surfaces extend away from the bottom surface.

8. The antenna module according to claim 6, wherein the magnetic body is disposed on the ceiling of the vehicle such that the magnetic body shields a magnetic field generated by the antenna and directed toward a window of the vehicle.

9. The antenna module according to claim 6, further comprising:
an accommodation case configured to accommodate the antenna and the magnetic body,
wherein the accommodation case is to be attached to the ceiling.

10. The antenna module according to claim 6,
wherein the magnetic body includes another pair of side walls spaced apart from each other, and
wherein the antenna is accommodated between the other pair of side walls such that the axial direction of the coil is parallel to a facing direction in which the other pair of side walls face each other.

\* \* \* \* \*